FIG. 1

Dec. 23, 1969    R. L. JAMES    3,486,100
PULSE WIDTH MODULATOR NETWORK
Filed Sept. 29, 1965    4 Sheets-Sheet 3

FIG. 3

INVENTOR
ROBERT L. JAMES
BY Herbert L. Davis
ATTORNEY

FIG. 4

United States Patent Office 3,486,100
Patented Dec. 23, 1969

3,486,100
PULSE WIDTH MODULATOR NETWORK
Robert L. James, Bloomfield, N.J., assignor to The Bendix
Corporation, a corporation of Delaware
Filed Sept. 29, 1965, Ser. No. 491,326
Int. Cl. H02p 5/06, 7/06
U.S. Cl. 318—341                                                    18 Claims

ABSTRACT OF THE DISCLOSURE

A pulse width modulator for controlling the duration and polarity sense of electrical pulses for energization of a load winding of a direct current motor so as to effect rotation of the motor at a speed dependent upon the duration of the electrical pulses and in a direction dependent upon the polarity of the energizing pulses.

---

This invention relates to a pulse width modulator network and more particularly to a novel pulse width modulator for controlling the duration and polarity sense of electrical pulses applied through a forward loop network to drive a direct current motor (having a fixed direct current field) linearly by pulse width modulated armature voltages in response to a direct current servo signal input and which driving pulses are of constant amplitude and act in a polarity sense dependent upon the polarity of the input signal and for a duration dependent upon the amplitude of the input signal.

In the direct current motor control system with which the pulse width modulator network of the present invention is particularly designed for use, the pulse width modulator network is periodically effected through a signal sampler network by dual voltage outputs from a preamplifier network in response to the amplitude and polarity of a signal voltage from a direct current signal source and said preamplifier may include an adder network to algebraically combine with the direct current voltage signal a feedback voltage acting in opposing relation with the signal voltage so as to dampen the control of the direct current motor operated by the pulse width modulator network.

An object of the invention is to provide such a pulse width modulator network of simplicity in design and of minimum number of parts for effecting direct current signal pulses for energizing the direct current motor and which pulses are of a constant amplitude and of a duration varying directly with the amplitude of the direct current voltage signal and of a polarity dependent upon the polarity of the signal voltage.

Another object of the invention is to provide in such a pulse width modulator network a pair of control capacitors chargeable in one sense in response to a signal voltage of one polarity and in an opposite sense in response to a signal voltage of an opposite polarity and including novel periodically controlled means for simultaneously effecting a discharge of both capacitors and thereafter initiating the charging of the capacitors.

Another object of the invention is to provide a novel pulse width modulator network for use with a dual channel direct current preamplifier effecting electrical outputs of opposite phase dependent upon the polarity of a direct current signal and the arrangement being such that the pulse width modulator network effects in response to selected samples of said dual phase outputs, electrical pulses of a constant amplitude and duration variable directly with the amplitude of the selected samples of the electrical outputs for energizing a load winding controlling the direction and speed of rotation of a direct current motor.

Another object of the invention is to provide a novel pulse width modulator network for operation with the preamplifier network including first and second control devices acting in opposite senses in response to direct current energizing voltages of opposite phase relation selectively applied at predetermined intervals to the pulse width modulator network so as to effect output signal pulses therefrom of constant amplitude and of a polarity and duration dependent directly on the phase relation and amplitude of the energizing voltages to control the sense of energization of a direct current motor and thereby the direction and speed of rotation thereof.

Another object of the invention is to provide means for converting a direct current command voltage into energizing pulses for a control winding of a direct current motor, the pulses being of a constant amplitude and acting in a sense and for a duration of time dependent upon the amplitude of the command voltage.

These and other objects and features of the invention have been pointed out in the following description as applied to a pulse width modulated servo drive control system shown in the accompanying drawings and in which the novel pulse width modulator network of the present invention is particularly adapted for use. It is to be understood, however, that the drawings are for the purpose of illustration only and are not a definition of the limits of the invention. Reference is to be had to the appended claims for this purpose.

The pulse width modulated servo drive control system illustrates an operative arrangement in which the novel pulse width modulator network of the present invention may be responsive through a preamplifier and signal sampler network to a direct current signal voltage and rate feedback voltage to provide control of a direct current motor for positioning with extreme accuracy a device such as a telescope in a star tracking system.

Figure 1:
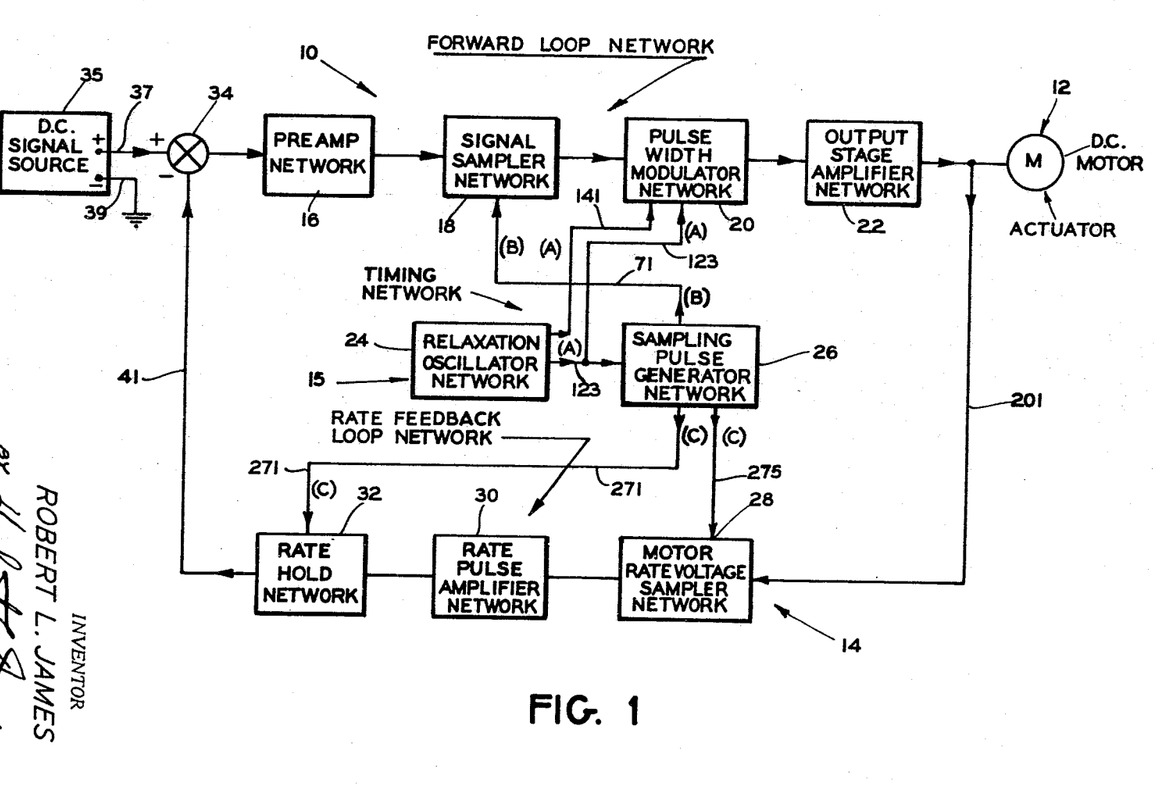
FIGURE 1 is a schematic block diagram illustrating a pulse width modulated servo drive control system in which the novel pulse width modulator network embodying the invention is particularly adapted for use.

Referring to the drawing of FIGURE 1, the system includes a forward loop network of a pulse width modulator type indicated generally by the numeral 10 for controlling a direct current motor actuator 12 including a rate feedback loop network 14, together with a timing network 15 for controlling the forward and rate feedback networks 10 and 14.

Included in the forward loop network 10 is a preamplifier network 16 operative in the control system to effect impedance matching, signal inverting and provide quiescent voltage biasing for a signal sampler network 18. The signal sampler network 18 samples the signal output from the preamplifier 16 superimposed on the quiescent bias output of the preamplifier network 16. The pulse width modulator 20 converts the amplitude modulated output of the signal sampler 18 to a constant amplitude recurring pulse having a pulse width proportional to the amplitude of the input signal.

An output stage amplifier network 22 delivers these pulses applied by the pulse width modulator network 20 to the direct current motor actuator 12. As hereinafter explained, the timing network 15 may include a relaxation oscillator network 24 and sampling pulse generator network 26 to supply required timing and sampling pulses to the motor rate voltage sampler network and rate hold network of the rate feedback loop network 14 and to the pulse width modulator network 20 and signal sampler network 18 of the forward loop network 10.

In the rate feedback loop network 14 there is provided the motor rate voltage sampler network 28 which samples the back electromotive forces at the direct current actuator motor 12 at regular recurring times between power driving pulses applied to the actuator motor 12.

A variable amplitude fixed duration output of the motor voltage sampler 28 is amplified by a rate pulse amplifier 30 and supplied to a rate hold circuit 32 which serves to hold the amplitude of the short duration pulse received from the rate hold amplifier 30 and delivers an equal amplitude direct current voltage at the adder network 34 to the input of the preamplifier 16 of the forward loop network 10 of the servo control system between said regular recurring times and thereby complete the rate feedback loop network 14.

Figure 2:
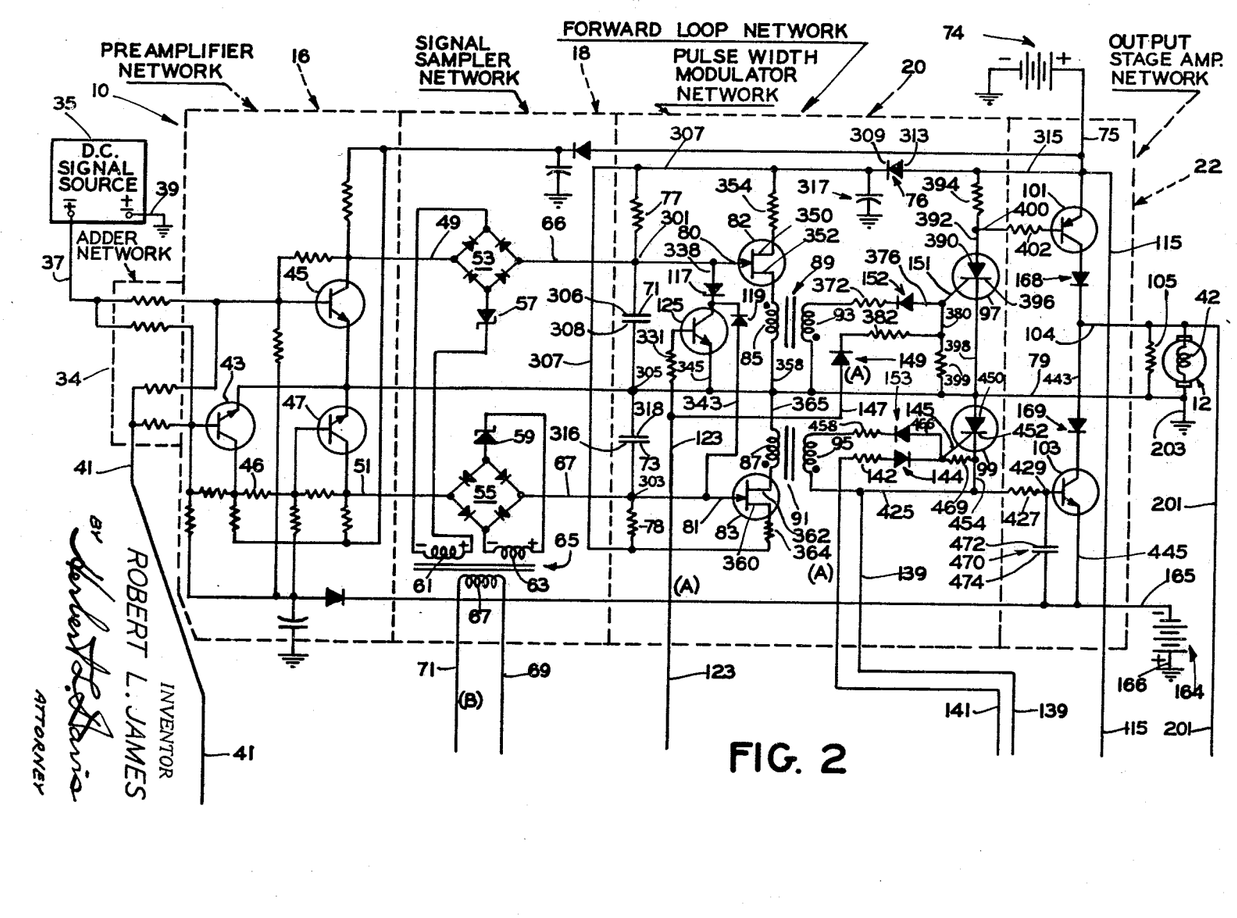
FIGURE 2 is a wiring diagram of the forward loop network of the servo drive control system of FIGURE 1 showing a wiring diagram of the pulse width modulator network which embodies the present invention as applied in the operative arrangement shown.
Figure 3:
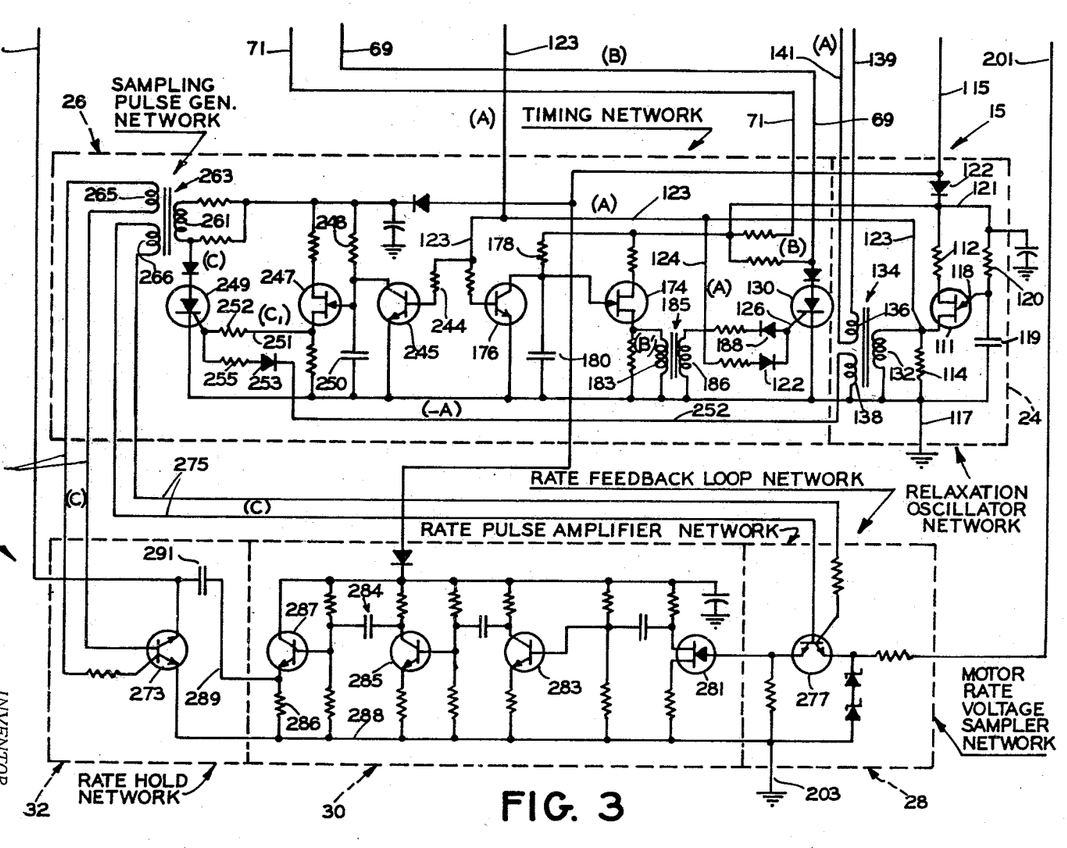
FIGURE 3 is a wiring diagram of the timing network and rate feedback loop network of the servo drive control system of FIGURE 1.

Referring now to FIGURES 2 and 3, the electrical network of the several components of the system of FIGURE 1 are shown in detail. A direct current signal source of conventional type and indicated by the numeral 35 supplies a direct current command voltage signal of variable amplitude and selected polarity across the conductors 37 and 39. The resistance adder network 34 combines this voltage signal with the follow up or rate feedback signal voltage of an amplitude variable directly with the velocity of the motor 12 and supplied through a conductor 41 from the output of the rate feedback loop network 14 so as to provide a direct current error voltage signal (obtained from subtraction of the command and rate feedback signals) applied through the preamplifier 16 to the signal sampler circuit 18 and thereby to the pulse width modulator 20 and output stage amplifier 22 to provide signal pulses across a control or load winding 42 of the actuator motor 12 which signal pulses have a width variable directly with the amplitude of the voltage of the direct current error signal. The preamplifier 16 is a two channel direct current amplifier including transistors 43, 45 and 47 of the low voltage gain (large local feedback) so as to provide impedance matching to the signal sampler circuit 18 and a phase inversion to selectively provide two output signals at lines 49 and 51 of opposite phase dependent upon the polarity of the input command voltage signal at conductor 37 and thereby effect the high direct current bias levels needed for the unijunction transistor pulse circuits of the pulse width modulator 20.

In the operation of the preamplifier 16 it will be seen that upon a positive signal being applied to the input conductor 37 and thereby to the base of the transistor 45, the transistor 45 will be rendered more conductive and thus the collector output at the line 49 becomes less positive. Conversely the positive signal supplied through the input conductor 37 will be applied to the base of the transistor 43 which will cause the transistor 43 to become more conductive causing the collector output coupled through a resistor 46 to the base of the transistor 47 to become less positive and the transistor 47 less conductive so that the output line 51 from the collector of the transistor 47 becomes more positive. Thus upon a positive signal being applied at the input conductor 37, the output line 49 of the transistor 45 becomes less positive while the output line 51 from the transistor 47 becomes more positive.

If the operating conditions are reversed and a negative direct current signal is applied through the conductor 37, it will be seen that the negative bias then applied to the base of the transistor 45 will cause the transistor 45 to become less conductive and the output line 49 therefrom more positive and conversely the negative signal applied to the base of the transistor 43 will render the transistor 43 less conductive and thereby the transistor 47 coupled thereto more conductive so that the output line 51 leading from the collector of the transistor 47 will become less positive.

Of course, upon a zero signal being applied to the input conductor 37, the positive bias applied by the battery 74 to the collector of the transistor 45 and to the collector of the transistor 47 will provide output signals at the lines 49 and 51 of equal positive value. The output lines 49 and 51 lead from the preamplifier network 16 into the signal sampler network 18.

The signal sampler network 18 includes balanced diode bridges 53 and 55, Zener diodes 57 and 59 and secondary windings 61 and 63 of a pulse sampling transformer 65 having a primary winding 67 with conductors 69 and 71 leading to the forward loop network 10 of FIGURE 2 from the sampling pulse generator 26 of FIGURE 3 so as to control the operation of the signal sampler network 18, as hereinafter explained.

The lines 49 and 51 apply output signals of opposite phase from the preamplifier 16 dependent upon the polarity of the command signal voltage applied at input conductor 37. The balanced bridges 53 and 55 are so controlled as to rapidly connect and disconnect the outputs of the preamplifier transistors 45 and 47 to pulse generator charging capacitors 71 and 73 of the pulse width modulator 20. This action establishes initial charges on the capacitors 71 and 73 bearing linear relationship to the signal inputs at conductors 49 and 51.

These initial charges on the capacitors 71 and 73 determine the time at which relatively slowly rising ramp voltages applied at control emitters 80 and 81 of the unijunction switching transistors 82 and 83 reach the threshold firing levels of the unijunction switching transistors 82 and 83.

The foregoing is effected by the amplitude of the signal inputs at conductors 49 and 51 and also by the continued charging of the capacitors 71 and 73 from a source of direct current or battery 74 having a negative terminal connected to ground and a positive terminal connected through a conductor 75, diode 76 and high resistances 77 and 78 respectively to one plate of each of the capacitors 71 and 73 with the opposite plate of said capacitors connected through a conductor 79.

Thus the ramp voltages applied at the control emitters 80 and 81 determine the time of the output pulses supplied through the unijunction transistors 82 and 83 to the respective primary windings 85 and 87 of coupling transformers 89 and 91 having secondary windings 93 and 95 which in turn serve to control silicon controlled rectifiers or trigestors 97 and 99. These output pulses are used to turn "off" the trigistors 97 and 99 which previously had been turned "on" by the action of reference pulse A just before initial charges were placed on the capacitors 71 and 73 by the action of the sampling pulse B.

The outputs of the trigistors 97 and 99 therefore are pulses having a width or duration modulated directly with the amplitude of the direct current input signal voltages supplied at conductors 49 and 51 since the trigistors 97 and 99 are periodically turned on at a set time and turned off at a later time depending on the amplitude of the input signal error voltage applied through the adder circuit 34 by the command signal voltage at the conductor 37 as modified by the rate feedback signal voltage applied through conductor 41.

The two channel circuitry of the input lines 49 and 51 of the signal sampler circuit 18 serves to provide operation for either polarity of input command signal applied at the input conductor 37. The use of a medium power transistor output amplifier stage 22 including transistors 101 and 103 (instead of driving or energizing the control or load winding 42 of the actuator motor 12 directly by the trigistors output pulses) serves to insure reliable turn off under inductive load conditions, and makes possible a short time constant of the decaying motor current on turn off. This in turn serves to make possible the control of the turn on and turn off times of the transistors 101 and 103 for minimizing radio frequency interference generation.

A resistance loading 105 connected across the single load winding 42 of the actuator motor 12 determines the peak (initial) value of the motor turn off inductive kick voltage. The higher the resistance value of the resistor 105, the higher the inductive kick voltage (and hence, required transistor voltage ratings) but also the lower the time constant of this inductive kick voltage. Since it is desired to have a minimum possible settling time for this transient inductive kick voltage, the trigistors 97 and 99 are so selected as to have high voltage ratings so as to allow the highest possible value of the motor loading resistance 105. Future system testings may relax this requirement of short transient settling time, allowing transistors of lower voltage ratings.

Also the advent of turn off type control rectifiers with high transient ratings and with high turn off current gain may serve to eliminate the transistor output stage 22 by simply driving the motor 12 directly with turn off type control rectifiers replacing the trigistors 97 and 99.

Some additional radio frequency interference filtering time might be needed because of the inherent very fast turn on and turn off times of the silicon controlled rectifiers or trigistors 97 and 99. This generated radio frequency interference would be found present in the conductors leading to the terminals of the motor 12. As hereinafter explained the relaxation oscillator 24 and sampling pulse generator 26 serve to generate pulses needed for the above described pulse width modulator 20.

The relaxation oscillator 24 (see FIGURE 3) includes a unijunction transistor 111 having base elements connected through suitable resistors 112 and 114 across the battery 74 by a conductor 115 leading to the positive terminal of the battery 74 and a grounded conductor 117 leading to the negative terminal of the battery 74. The unijunction transistor 111 further includes a control emitter 118 coupled through a capacitor 119 to the grounded conductor 117 and connected through a resistor 120 and conductor 121 to the cathode of a diode 122 having an anode element connected through the conductor 115 to the positive terminal of the battery 74. The charging capacitor 119 is periodically charged to the threshold firing level of the unijunction transistor 111 at predetermined time intervals dependent upon the selected values of the resistor 120 and capacitor 119.

Figure 4:
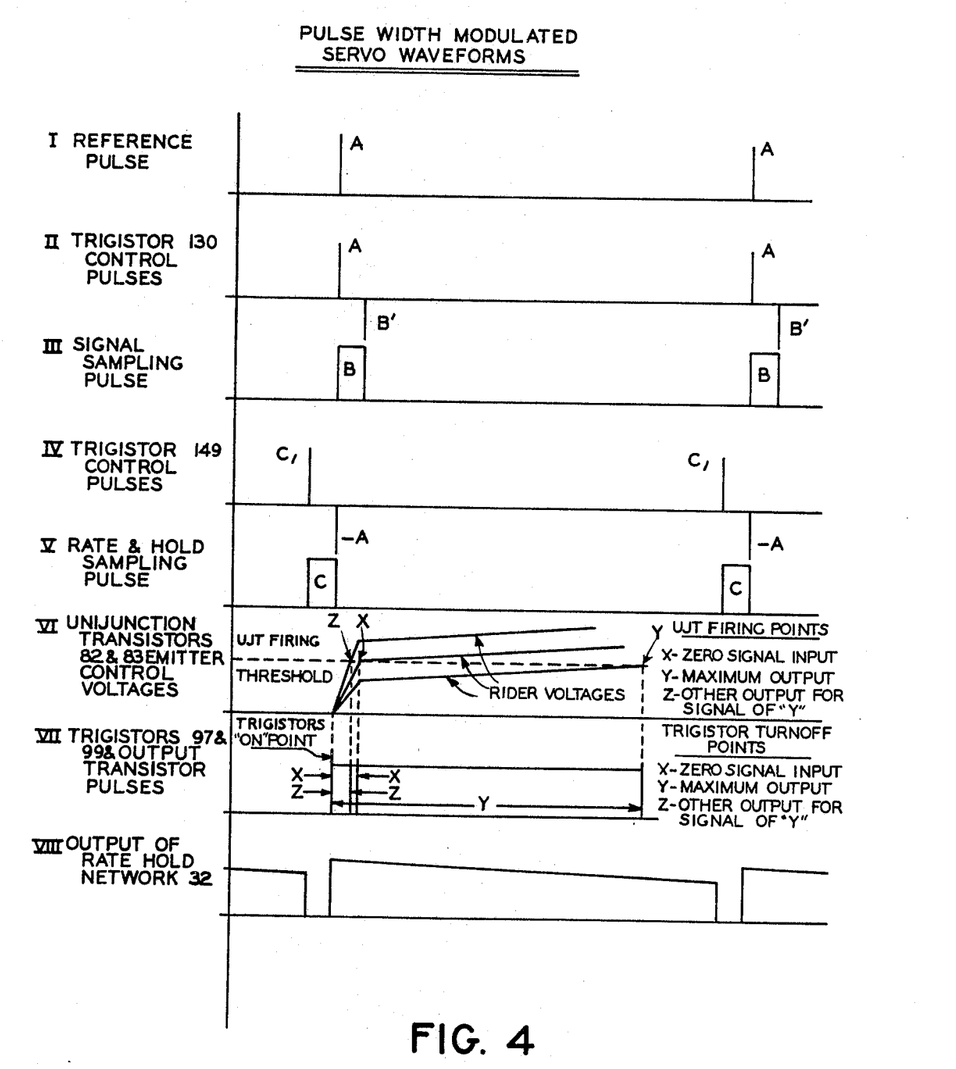
FIGURE 4 is a graphical illustration of the wave forms effected in the electrical networks of FIGURES 2 and 3 at the designated points.

The arrangement is such as to provide output reference pulses A, as shown graphically at I of FIGURE 4, at predetermined timed intervals applied through an output conductor 123 to the base of a control transistor 125 of the pulse width modulator 20, and through a conductor 124 and positive going diode 122 to the gating terminal 126 of a silicon controlled rectifier or trigistor 130 of the network 26, as shown graphically at II of FIGURE 4, so as to provide at the output of the trigistor 130 signal sampling pulses B, as shown at III of FIGURE 4 and applied through conductors 69 and 71 across the primary winding 67 of the pulse sampling transformer 65.

In addition to the output reference pulses A applied through the conductor 123, such reference pulses are also applied through a primary winding 132 of a transformer 134 having secondary windings 136 and 138. The primary winding 132 is connected across the resistor 114 and has one terminal connected to the output conductor 123 and an opposite terminal connected to the grounded conductor 117.

The secondary winding 136, as shown by FIGURE 3, has one terminal connected through a conductor 139 to the cathode element of the silicon controlled rectifier or trigistor 99 while the opposite terminal of the secondary winding 136 is connected through a conductor 141, resistor 142 and a positive going diode 144 to the gating terminal 145 of the trigistor 99, as shown by FIGURE 2, so as to turn on the trigistor 99 upon the output reference pulse A being applied through the primary winding 132 and thereby induced in the secondary winding 136 of the transformer 134.

Similarly, the output pulse A applied through the conductor 123 and thereby through a conductor 147, shown in FIGURE 2, and the positive going diode 149 to the gating terminal 151 of the trigistor 97 serves to likewise turn on such trigistor 97.

Both the trigistor 97 and the trigistor 99 are turned off respectively by the signal pulses applied in the secondary windings 93 and 95 through negative going diodes 152 and 153 to the gating terminals 151 and 145, respectively, of the trigistors 97 and 99. The signals induced in the secondary windings 93 and 95 correspond with the amplitude of the direct current input signal voltage supplied at conductors 49 and 51, as heretofore explained.

The respective outputs from the trigistor 97 or 99, as the case may be, is in turn applied, respectively, to the bases of the transistor 101 or 103 of the output stage amplifier 22 and thereby across the load winding 42 of the motor 12.

In this connection it may be noted that the transistor 101 has an emitter connected through conductor 75 to the positive terminal of the battery 74 and in response to the output signal from the trigistor 97 serves to control the energization of the load winding 42 of the motor 12 from the source of electrical energy or battery 74. On the other hand, the transistor 103 in response to the signal output of the trigistor 99 serves to control the energizing current to the load winding 42 of the motor 12 applied from a second source of electrical energy or battery 164. The battery 164 has a negative terminal connected through a conductor 165 to the emitter of the transistor 103 while the positive terminal of the battery 164 is connected to ground through a conductor 166.

In the aforenoted arrangement, the collector of the amplifier transistor 101 is connected through a positive going diode 168 to the conductor 104 leading to the load winding 42 of the motor 12 while the collector of the amplifier transistor 103 is connected through a negative going diode 169 to the conductor 104 leading to the load winding 42 of the motor 12. It will be seen then that the transistor 101 controls energization in one sense of the load winding 42 from the battery 74 so as to effect rotation of the motor 12 in one direction while the transistor 103 controls energization of the load winding 42 in an opposite sense from the battery 164 so as to effect rotation of the motor 12 in an opposite direction.

The output pulses applied across the conductors 104 and 203 to the load winding 42 of the motor 12 will be in a polarity sense dependent upon whether the direct current command signal applied at the input 37 is of a positive or negative polarity and these output pulses will be at a repetition rate dependent upon the predetermined time interval of the reference pulses A supplied by the relaxation oscillator 15 through the action of the unijunction control transistor 111, as heretofore explained. Moreover, the duration of these motor control pulses will be dependent upon the amplitude of the direct current command signal applied through the input conductor 37.

Thus the reference pulse A sets the repetition rate of the motor drive pulses applied through the pulse width modulator 20 and serves as a timing reference for all circuit functions.

The pulse generators or unijunction switching transistors 82 and 83 of the pulse width modulator 20 are reset for the start of each new cycle by the pulse A applied through the conductor 123 to the base of the transistor 125 which serves to turn on the transistor 125 for the duration of the pulse A whereupon the transistor 125 acts to discharge the capacitors 71 and 73 through two disconnect diodes 117 and 119. This resetting operation is completed just prior to sampling the direct current signal for initially charging the capacitors 71 and 73.

Besides the reference pulse A, shown graphically at I and II of FIGURE 4, there are generated two sampling pulses of controlled duration from the occurrence of the pulse A. Similar circuitry is used for both of the sampling pulses. One of the pulses is a sampling pulse B, shown graphically at III of FIGURE 4 for energizing the signal sampler network 18 of FIGURE 2.

This sampling pulse B is generated by the action of the trigistor or silicon controlled rectifier 130, unijunction switching transistor 174 and transistor 176 of FIGURE 3.

Pulse A applied by conductor 123 to a base of transistor 176 serves to reset a timing circuit including resistor 178 and capacitor 180 for the unijunction transistor 174. The resistance capacitor timing circuit 178–180 effectively controls the emitter of the unijunction transistor 174 so as to produce at the output thereof a pulse B′, shown graphically at II of FIGURE 4, a predetermined time later than the occurrence of pulse A (for example, two milliseconds) due to a charging of the reset capacitor 180 up to the firing threshold voltage of the unijunction transistor 174. This pulse B′ (shown graphically in II of FIGURE 4) is then applied through a primary winding 183 of a coupling transformer 185 in the output of the unijunction transistor 174. The pulse B′ is induced in a secondary winding 186 of the transformer 185 and applied thereby through a negative going diode 188 to the gating terminal 126 so as to turn off the silicon controlled rectifier or trigistor 130 (trigistor 130 having been previously turned on by the action of pulse A applied through the conductor 124 and the positive going diode 122).

The output pulse B of the trigistor 130 (FIGURE 3) appearing in the primary winding 67 of the transformer 65 (FIGURE 2) is then a precisely controlled two millisecond rectangular pulse B, as shown graphically at III of FIGURE 4, starting at the end of pulse A and ending at the beginning of pulse B′, as shown graphically at II of FIGURE 4.

The other sampling pulse heretofore referred to and denoted as pulse C, shown graphically at V of FIGURE 4, is generated by circuitry, as shown in FIGURE 3, including transistor 247, unijunction transistor 247, and trigistor or silicon controlled rectifier 249, as hereinafter explained.

The pulse C appears at the output of trigistor 249 which is turned on by a pulse $C_1$ and turned off by pulse —A, as shown graphically at IV and V of FIGURE 4.

In effecting the output pulse $C_1$, the reference pulse A at conductor 123 is applied through a resistor 244 so as to enter the base of the discharging transistor 245 to serve to reset a timing circuit including resistor 248 and capacitor 250 for the unijunction transistor 247. The resistance capacitor timing circuit 248–250. effectively controls the emitter of the unijunction transistor 247 so as to produce at the output thereof a pulse $C_1$, shown graphically at IV of FIGURE 4, a predetermined time interval after the occurrence of the immediately preceding reference pulse A due to a charging of the reset capacitor 250 up to the firing threshold voltage of the unijunction transistor 247. This pulse $C_1$ (shown graphically in IV of FIGURE 4) is then applied through a conductor 251 and resistor 252 to the gating terminal of the silicon controlled rectifier or trigistor 249 to turn on the trigistor 249.

Thereafter, a reference pulse —A induced in the secondary winding 138 of the transformer 134 and applied through a conductor 252 and negative going diode 253 and resistor 255 to the gating terminal of the silicon controlled rectifier or trigistor 249 is effective to turn off the trigistor 249 a predetermined time later than the occurrence of the pulse $C_1$. The pulse C (shown graphically in V of FIGURE 4) at the output of the trigistor 249 is then a precisely controlled rectangular pulse C, as shown graphically in V of FIGURE 4, starting at the end of pulse $C_1$ and ending at the beginning of pulse —A, as shown graphically at V of FIGURE 4.

The pulse C, shown graphically at V of FIGURE 4, is applied to a primary winding 261 of a coupling transformer 263 having output secondary windings 265 and 266. Winding 265 is connected through conductors 271 to control an "inch" transistor chopper device 273 in the rate hold network 32 of the rate feedback loop network 14 while the output winding 266 of the coupling transformer 263 is connected through conductors 275 to control the operation of an "inch" transistor chopper device 277 of a rate voltage sampler network 28 of the rate feedback loop network 14. The output of the rate voltage sampler network 28 is connected to the input of the rate pulse amplifier network 30 while the rate hold circuit 32 has an input connected at the output of the rate pulse amplifier 30, shown in FIGURE 3. The rate pulse amplifier network 30 includes a field effect transistor 281 connected to the output of the "inch" transistor chopper device 277 as well as transistor amplifiers 283 and 285 and an output transistor 287 having a resistor 286 connected between a grounded conductor 288 and an emitter of the transistor 287 with an output conductor 289 and the grounded conductor 288 being coupled across the "inch" transistor chopper device 273 by a coupling capacitor 291. A conductor 41 leads from the output of the chopper device 273 to the adder circuit 34 and thereby to the input of the preamplifier 16.

Operation

In explanation of the operation of the forward loop network 10, the direct current command signal applied through the conductor 37 will be selectively effective, dependent upon the polarity thereof, to cause the transistor 45 or the transistors 43–47, as heretofore explained, to apply a more positive control signal through one of the output lines 49 or 51 and a less positive control signal through the other of the output lines 49 or 51.

The positive control signal is then applied by the output lines 49 and 51 through the positive going diodes of the balanced bridges 53 and 55 and through lines leading from one arm thereof to the secondary windings 61 and 63 of the pulse sampling transformer 65 and thereby to the cathode element of the Zener diodes 57 and 59 having an anode element connected to an opposite arm of the respective bridges 53 and 55. The Zener diodes 57 and 59 have a reverse current breakdown characteristic such as to permit a reverse flow of current therethrough upon the sampling pulse B being induced in the secondary windings 61 and 63. The control signal pulse is applied then from the lines 49 and 51 through the bridges 53 and 55 to the windings 61 and 63 and upon the reverse current breakdown of the Zener diodes 57 and 59 effected by the sampler pulse B, the control signal pulse is applied at the respective output lines 66 and 67, with the sampling pulse B being cancelled out the opposite input and output lines of the balanced bridges 53 and 55.

The breakdown characteristic of the Zener diodes 57 and 59 is sufficiently low however as to prevent a reverse flow of current therethrough in the absence of the sampling pulse B so that in the latter case no positive current flow is effected at either output conductor 66 or 67 On the other hand upon the sampling pulse B being applied to the secondary windings 61 and 63 the Zener diodes 57 and 59 permit the flow of positive current through the output conductors 66 and 67 to effect a charging of the capacitors 71 and 73 during the interval that the sampling pulse B is applied through the primary winding 67 of the pulse sampling transformer 65

In the event a zero control signal is applied to the input conductors 37 then upon the application of the sampling pulse the current flow effected at the output conductors 66 and 67 by the battery 74 will be of an equal positive value. However, upon the control signal applied at the conductor 37 being of a positive value then the output signal current applied at the output conductor 66 will have a less positive value while the output current applied at the output conductor 67 will have a more positive value. Conversely, upon the input signal applied at the conductor 37 being of a negative value then the output signal applied at the output conductor 66 will have a greater positive value while the output current applied at the output conductor 67 will have a lesser positive value.

The output conductors 66 and 67 thus provide a flow of charging current to the respective capacitors 71 and 73 during the interval that the sampling pulse B is applied through the pulse sampling transformer 65.

Further, the pulse A, as shown graphically at II and III of FIGURE 4, is effective at the initiation of the sampling pulse B to act through the conductor 123 on the base of the transistor 125 so as to render the transistor 125 conductive at the start of the signal sampling pulse B while at the same time the pulse A acts through conductor 147 to turn on the trigistor 97 and through conductor 141 to turn on the trigistor 99.

The transistor 125 then provides a discharge path for the capacitor 71 through the diode 117 and another discharge path for the capacitor 73 through the diode 119. Thereafter, the charging cycle for the capacitors 71 and 73 is effective for the period of the signal sampling pulse B and the charge thus applied to the capacitor 71 and 73 upon reaching the firing level of the unijunction transistors 82 and 83 acts to render the same conductive.

Thus, for example, as shown graphically at VI and VII of FIGURE 4, upon a zero signal input being applied at the conductor 37, the control voltage applied at the emitters of the unijunction transistors 82 and 83 will be of equal value and of a value indicated by the line X of the graph VI resulting in the transistors 82 and 83 both firing at the same time to apply a control pulse in the windings 93 and 95 at the same time to turn off the trigistors 97 and 99 as indicated graphically at VII of FIGURE 4 by X. Since the outputs then of the trigistors 97 and 99 will be of equal value at the same time and of opposite polarity, the positive collector output applied through the transistor 101 by the battery 74 will pass directly through diodes 168 and 169 and in turn through the transistor 103 to the negative terminal of the battery 164 returning through the grounded connection 166 to the negative terminal of the battery 74.

However, upon a positive or negative direct current signal voltage being applied through the input conductor 37, the charge applied to one or the other of the capacitors 71 and 73 will be greater so that the control voltage applied to the emitter of one or the other of the transistors 82 or 83 will cause the unijunction transistors 82 or 83 controlled by the capacitor 71 or 73 having the greater positive charge applied thereto to fire at point Z, as indicated graphically at VI of FIGURE 4, while the other of the unijunction transistors 82 or 83 controlled by the capacitor 71 or 73 having the lesser positive charge applied thereto will fire at the point Y, as the charge applied to the latter controlling capacitor is built up by the charging current applied through resistor 77 or 78 by the battery 74 to the critical firing level of the unijunction transistor, as indicated at VI of FIGURE 4. This action will then cause the transistor 82 or 83 controlled by the greater charged capacitor 71 or 73 to first apply a controlling pulse to the primary winding 85 or 87 acting through coupling transformer 89 or 91 to turn off the trigistors 97 or 99 controlled thereby at the point Z, while the last to fire unijunction transistor 82 or 83 controlled by the lesser charged capacitor will apply a pulse through the coupling transformer 89 or 91 acting to turn off the trigistor 97 or 99 at the point Y upon the charge on such capacitor increasing to the firing level of the other unijunction transistor thus acting to apply an energizing pulse for the motor 12 through the transistor 101 or 103, as the case may be, of the duration Y indicated graphically in FIGURE 4 by VII.

This motor energizing pulse will be applied across output lines 104 and 79 and will be for a duration variable with the amplitude of the input command signal 37. In this operation it will be seen that the pulse width modulator 20 in effect converts the amplitude modulated output of the signal sampler 18 to a constant amplitude recurring pulse in the load winding 42 of the motor 12 having a pulse width proportional to the amplitude of the input signal applied to the input conductor 37. The unijunction transistors 82 or 83 are thereby selectively operable in the sense that one precedes the other dependent upon the polarity of the input command signal applied to the conductor 37. This input command signal in turn controls the trigistors 97 or 99, as the case may be, to effect the constant amplitude pulse of the width proportional to the amplitude of the input signal at the output of the transistor 101 or 103 which in turn delivers these pulses to the load winding 42 of the direct current motor actuator 12.

The pulse thus applied to the load winding 42 of the motor 12 will cause rotation of the motor in one direction when effected through the transistor 101 and in an opposite direction when affected through the transistor 103 which action is in turn controlled by the polarity of the direct current command signal applied through the conductor 37.

Furthermore, during the intervals of interruption between each energizing pulse applied to the load winding 42 of the motor 12, there will be generated across the winding 42 a back electromotive force of a polarity dependent upon the direction of rotation of the motor effected by the command signal applied through the conductor 37 and of an amplitude variable with the speed of rotation of motor 12.

This sampled armature voltage is applied through the rate feedback loop network 14, as hereinafter explained, to the adder network 34 as a direct current signal of a polarity acting in opposition to the command signal applied through the conductor 37 to provide a desired damping action on the control of the motor 12.

In explanation of the rate feedback loop 14, it will be noted that there is provided the "inch" transistor chopper device 277 in the rate voltage sampler circuit 28 which acts with each sampling pulse C to sample the voltage across the motor load winding 42 applied through the conductor 201 and grounded conductor 203 when the pulse drive voltage applied across the conductors 104 and 79 to the load winding 42 of the motor 12 drops to zero near the end of the drive pulse cycle.

It will be noted that, as shown graphically at III and V of FIGURE 4, the rate and hold sampling pulse C immediately precedes in time the signal sampling pulse B and at the time of the sampling pulse C (after a motor turn off transient has settled out) the motor output voltage applied across the lines 201 and 203 is due to the speed of rotation only of the motor 12 so that the sample signal from this motor voltage is a rate signal (i.e., amplitude of the sample pulse is proportional to the speed of rotation of the motor 12 which is in turn dependent on the amplitude of the command signal voltage at input 37 while its sign is dependent on the direction of rotation of the motor 12 which is in turn dependent on the polarity of the command signal voltage at input 37).

The "inch" device 277 has a very low coupling between its energizing pulse applied across the lines 275 and the signal applied across the lines 201 and 203. The arrangement is such as to require no matched components and provides simplicity and small size.

The rate pulse amplifier 30 includes a field effect transistor 281 for gain and high input impedance, two common emitter transistor stages 283 and 285 for gain and a transistor 287 providing an emitter follower output and a low output impedance to the rate hold network 32. The transistor stages 285 and 287 are coupled by a resistance-capacitance network 284 to avoid the drift which would occur had a direct coupled direct current amplifier arrangement been used.

A field effect input stage 281, by requiring no bias connections at its input, allows direct coupling to the output of the "inch" transistor chopper device 277. If instead, bias current were supplied to this input circuit with direct coupling to the chopper device 277, operation of the chopper device would alter the bias circuit and produce pulse outputs even upon a zero signal voltage being sampled. Direct coupling not only saves a capacitor (reducing circuit complexity, cost and size), but eliminates the slope-off and back swing distortion produced by a resistance-capacitance coupling of pulse amplifier circuits. To minimize slope-off and back swing distortion, a time constant of the resistance-capacitance coupling elements must be long compared to the pulse duration.

Operation of the output hold circuit 32 is as follows: the "inch" transistor chopper device 273 in the hold circuit 32 is closed by the sampling pulse C, shown graphically at V of FIGURE 4, and which is identical to that effective to close the "inch" transistor chopper device 277 provided in the rate voltage sampler network 28.

The closing of the chopper device 273 connects the coupling capacitor 291 immediately across the output of the rate hold network 32 for the interval of the pulse C, as shown graphically at VIII of FIGURE 4. Thus, an amplified sample signal pulse appears at the output of emitter follower 287 at the same time that the "inch" transistor chopper device 273 connects the capacitor 291 across the output of the emitter follower transistor 287.

The capacitor 291 quickly charges up to the quiescent direct current voltage and the amplified sampled signal pulse, with a short time constant due to the low output impedance of the emitter follower resistor 286 and the low saturated resistance of the "inch" transistor chopper device 273.

When the pulse C is terminated, the "inch" transistor chopper device 273 opens and the voltage across it or the hold output voltage, is a series combination of the voltage across the capacitor 291 and voltage across the resistor 286 in the output of the emitter of the transistor 287. While pulse C, shown graphically at V of FIGURE 4, was present, these voltages were equal but now they have become unequal by the amount of the amplified sampled signal pulse. The reason for this is that passage of the signal sampling pulse C allows the voltage across resistor 286 to change back to its quiescent value while the voltage across the capacitor 291 remained as before except for slow leakoff due to loading on the hold circuit output applied through conductor 41. Thus the output of the hold network 32, as shown at VIII of FIGURE 4, is a held direct current voltage level of an amplitude equal to and polarity opposite to the amplified signal pulse appearing across resistor 286. This rate signal from the hold circuit 32 then is connected back through the adder circuit 34 to the servo input signal terminals as rate feedback so as to complete the rate loop 14.

Pulse width modulator network

The present invention is directed to the novel pulse width modulator network 20 which may be used in the heretofore described control system.

In the aforenoted system the positive output signal voltages periodically applied to the output conductors 66 and 67 of the signal sampler network 18 are applied, respectively, to terminals 301 and 303 of the pulse width modulator network 20 while the grounded conductor 79 leading to the negative terminal of the battery 74 from the preamplifier network 16 is also connected to a terminal 305 of the pulse width modulator network 20.

Connected across the terminals 301 and 305 is the capacitor 71 having a plate 306 connected to the positive signal conductor 66 and an opposite plate 308 connected to the negative grounded conductor 79. Connected to the terminal 301 and thereby to the plate 306 of the capacitor 71 is one end of a resistor 77 having an opposite end connected to a conductor 307 leading to a cathode element 309 of the diode 76 having an anode element 313 connected through a conductor 315 to the conductor 75 leading to the positive terminal of the battery 74 having a negative terminal connected to a common ground. A filter capacitor 317 has one plate connected to the conductor 307 and an opposite plate connected to ground. Further, the conductor 66 leads from the terminal 301 to the control emitter 80 of the unijunction transistor 82.

An initial positive charge is then applied to the plate 306 of the capacitor 71 by the positive signal voltage sample at the conductor 67 due to the action of the signal sampler network 18, as heretofore explained.

This initial positive charge applied to the plate 306 of the capacitor 71 determines the time required for such initial charge to be slowly increased to the threshold firing level of the unijunction transistor 82. This additional charging action is effected through resistor 77 which bleeds a flow of electrical current from the positive terminal of the battery 74 to the plate 306 of the capacitor 71 so as to cause a slowly rising positive ramp voltage to be applied at the plate 306 and thereby to the control emitter 80. When the voltage thus applied at the emitter 80 reaches the threshold firing level of the unijunction switching transistor 82, as illustrated graphically at VI of FIGURE 4, the transistor 82 fires so as to render the transistor 82 conductive for effecting a control function, as heretofore explained.

Similarly, there is provided the capacitor 73 having a plate 316 connected to the positive signal conductor 67 and an opposite plate 318 connected to the negative grounded conductor 79. Connected to the terminal 303 and thereby to the plate 316 of the capacitor 73 is one end of a resistor 78 having an opposite end connected to the conductor 307 leading through the diode 76 and conductor 315 to the positive terminal of the battery 74 having a negative terminal connected to the common ground. Further, the conductor 67 leads from the terminal 303 to the control emitter 81 of the unijunction transistor 83.

An initial positive charge is then applied to the plate 316 of the capacitor 73 by the positive signal voltage sampled at the conductor 67 due tot he action of the signal sampler network 18, as heretofore explained.

This initial positive charge applied to the plate 316 of the capacitor 73 determines the time required for such initial charge to be slowly increased to the threshold firing level of the unijunction transistor 83. This additional charging action is effected through resistor 78 which bleeds a flow of electrical current from the positive terminal of the battery 74 to the plate 316 of the capacitor 73 so as to cause a slowly rising positive ramp voltage to be applied at the plate 316 and thereby to the control emitter 81. When the voltage thus applied at the emitter 81 reaches the threshold firing level of the transistor 83, as illustrated graphically at VI of FIGURE 4, the transistor 83 fires so as to render the transistor 83 conductive for effecting a control function, as heretofore explained.

Further, controlling the charging and discharging cycles of operation of the capacitors 71 and 73 is an NPN type transistor 125 having a base, collector and emitter. The base is connected through a resistor 331 to the conductor 123, while the collector of the transistor 125 is connected to a cathode element of the diode 117 and a cathode element of the diode 119. The diode 117 has an anode element connected through a conductor 338 to the conductor 66, while the diode 119 has an anode element connected through a conductor 343 to the conductor 67. The emitter of the transistor 125 is connected through a conductor 345 to the grounded conductor 79.

The arrangement of the capacitor discharge control transistor 125 is such that upon the pulse A, as shown graphically at II of FIGURE 4, being applied through the conductor 123 and resistor 331 to the base of the transistor 125, the transistor 125 is rendered conductive from the collector element to the emitter element thereof so as to thereby close a discharging path for the capacitor 71 from the positively charged plate 306 thereof through conductors 66 and 338, diode 117, collector and emitter elements of the transistor 125 through conductor 345 to the grounded conductor 79 returning thereby to the opposite negative plate 308 of the capacitor 71. Similarly, the rendering of the transistor 125 conductive by the application of the pulse A to the base element thereof renders effective a discharging path for the capacitor 73 from the positively charged plate 316 through conductor 67 and diode 119, collector and emitter elements of the transistor 125 through conductor 345 leading to the grounded conductor 79 and thereby returning to the opposite negative plate 318 of the capacitor 73.

Upon cessation of the pulse A, as shown graphically at II of FIGURE 4, the transistor 125 is rendered nonconductive to thereby terminate the discharging cycle of the capacitors 71 and 73. With the termination of the discharging cycle, there is initiated the charging cycle of the capacitors 71 and 73 in response to the sample voltage signals applied at the conductors 66 and 67 by the signal sampler network 18. The signal sampler network 18 is rendered effective by the sampling pulse B which is in turn initiated by the control pulse A and terminated by the control pulse B' through the operation of the timing network 26 of FIGURE 3, as heretofore explained, and shown graphically at III of FIGURE 4.

Further, as shown in FIGURE 2, the unijunction transistor 82 includes base elements 350 and 352 and the control emitter 80 biased by the positive charge applied to the plate 306 of the capacitor 71. The base element 350 is connected through a resistor 354 to the conductor 307 and thereby through the diode 76 and conductor 315 to the positive terminal of the battery 74 while the base element 352 is connected through a conductor to one end of the primary winding 85 of the coupling transformer 89. The opposite end of the primary winding 85 is connected through a conductor 358 to the grounded conductor 79 returning thereby to the grounded negative terminal of the battery 74.

Similarly, the unijunction transistor 83 includes base elements 360 and 362 and the control emitter 81 biased by the positive charge applied to the plate 316 of the capacitor 73. The base element 360 is connected by a resistor 364 to the conductor 307 and thereby through the diode 76 and conductor 315 to the positive terminal of the battery 74. The base element 362 is connected through a conductor to one end of the primary winding 87 of the coupling transformer 91. The opposite end of the primary winding 87 is connected through a conductor 365 to the grounded conductor 79 and thereby returning to the negative terminal of the battery 74.

The coupling transformer 89 has the secondary winding 93 connected at one end to the conductor 79 while the opposite end of the primary winding 93 is connected through a resistor 372 to a cathode element of a diode 152 having an anode element connected through a conductor 376 to a gating terminal 151 of the silicon controlled rectifier or trigistor 97.

The gating terminal 151 of the trigistor 97 is further connected through a conductor 380 and resistor 382 to a cathode element of the diode 149 having an anode element connected through the conductor 147 to the conductor 123.

Thus upon the positive control pulse A generated by the timing network 26 being applied through the conductor 123 and diode 149 to the gating terminal 151 of the trigistor 97, the trigistor 97 will be rendered conductive while thereafter upon the unijunction transistor 82 firing, an electrical pulse will be applied through the primary winding 85 of the coupling transformer 89 which will induce in the secondary winding 93 an electrical pulse acting in a negative sense through the resistor 372, and diode 152 on the gating terminal 151 of the trigistor 97 which will in turn render the trigistor 97 nonconductive.

The silicon controlled rectifier 97 has an anode 390 connected by a conductor 392 and resistor 394 to the conductor 315 leading from the positive terminal of the battery 74. The silicon controlled rectifier 97 also has a cathode 396 connected by a conductor 398 to the grounded conductor 79 returning thereby to the negative terminal of the battery 74. A resistor 399 is connected between the conductor 380 and the conductor 79 and thereby between the gating terminal 151 and the cathode 396.

An output conductor 400 leads from the conductor 392 through a resistor 402 to a base of a PNP type transistor 101 having an emitter connected through conductor 75 to the positive terminal of the battery 74 and a collector connected to the anode element of the diode 168 having a cathode element connected to the conductor 104 leading to the control load winding 42 of the motor 12, as heretofore described. Thus upon the silicon controlled rectifier 97 being rendered conductive, a negative bias is applied to the base of the transistor 101 to render the transistor 101 conductive between the emitter and collector thereof while upon the trigistor 97 being turned off or rendered nonconductive, a positive bias is applied to the base of the transistor 101 to render the transistor 101 nonconductive between the emitter and collector thereof to effect the control action of the motor 12, as heretofore described in reference thereto.

It will be seen that so long as the silicon controlled rectifier or trigistor 97 remains in a nonconductive state, a positive bias will be applied to the base of the transistor 101 from the battery 74 to render the transistor 101 nonconductive from the emitter to the collector thereof. However, upon the positive pulse A being applied through the diode 149 to the gating terminal 151 rendering the trigistor 97 conductive to pass current from the anode 390 to the cathode 396, a negative bias will be applied to the base of the PNP type transistor 101 to render the transistor 101 conductive of electrical energy from the positive terminal of the battery 74 through conductor 75, transistor 101 and thereby through diode 168 to the load winding 42 of the actuator motor 12 returning through grounded conductor 203 to the negative terminal of the battery 74. This energizing pulse at the output of the transistor 101 will continue, as indicated graphically at VII of FIGURE 4, until the gating terminal 151 of the trigistor 97 has once again applied thereto a negative bias to render the trigistor 97 nonconductive.

Such negative bias to turn off the trigistor 97 is applied through the coupling transformer 89 upon the control emitter 80 of the unijunction transistor 82 being biased by the charge applied to the capacitor 71 to a level in excess of a predetermined firing point of the unijunction transistor 82.

Thus the duration of the energizing pulse applied through the transistor 101 will be dependent upon the time required to charge the capacitor 71 to the predetermined firing point of the unijunction transistor 82 which will in turn be dependent upon the amplitude of the sampled signal pulse applied at the output conductor 66 of the signal sampler network 18 and thereafter upon the time required to charge the capacitor 71 through the resistor 77 to this predetermined firing point.

Similarly, the coupling transformer 91 has a secondary winding 95 inductively coupled to the primary winding 87 and connected at one end to a conductor 425 leading through a resistor 427 to a conductor 429 and thereby to a base of an NPN type transistor 103 having a collector and an emitter. The collector is connected through a conductor to a cathode element of a diode 169 having an anode element connected by a conductor leading to the output conductor 104. The emitter of the transistor 103 is connected by a conductor 445 to the conductor 165 leading to the negative terminal of the battery 164 having a positive terminal connected by a conductor 166 to a common ground.

Thus, the secondary winding 95 of the coupling transformer 91 is connected through the conductor 425 and resistor 427 to the base of the transistor 103 and thereby through the emitter of the transistor 103 to the conductor 445 leading to the negative terminal of the battery 164 while the positive terminal of the battery 164 is connected through the conductor 166 to a common ground which in turn is connected through the conductor 203 to the conductor 79 to which is connected an anode element 450 of the silicon controlled rectifier or trigistor 99 having a cathode element 452 connected through a conductor 454 to the conductor 425. The secondary winding 95 of the coupling transformer 91 has another end thereof connected through a conductor and resistor 458 to a cathode element of a diode 153 having an anode element connected by a conductor 466 to the gating terminal 145 of the silicon controlled rectifier or trigistor 99. A resistor 469 is connected between the conductor 454 and the conductor 466 and thereby between the gating terminal 145 and the cathode element 452.

Furthermore, the conductor 139 leads from the oscillator network 15 to the conductor 425 while the opposite conductor 141 leading from the network 15 is connected through a resistor 142 to an anode element of the diode 144 having a cathode element connected through a conductor to the gating terminal 145 of the trigistor 99.

The arrangement is such that upon a positive going pulse A being applied across the conductors 139 and 141, as heretofore explained, and through the resistor 142 and diode 144 to the gating terminal 145, the silicon controlled rectifier or trigistor 99 will be rendered conductive of a flow of electrical energy from the positive terminal of the battery 164 through grounded conductor 166 and grounded conductor 203 to conductor 79, and thereby through anode 450, cathode 452 and conductor 454 to the conductor 425 leading to the base of transistor 103 and through the emitter element of the transistor 103 to conductor 445 and thereby through conductor 165 to the negative terminal of the battery 164.

A capacitor 470 is connected between the conductor 429 and the conductor 165 and has a plate 472 connected to the conductor 429 and an opposite plate 474 connected to the conductor 165. The plate 472 is thus positively charged upon the trigistor 99 being rendered conductive.

In the latter operation it will be seen that upon the trigistor 99 being rendered conductive, the resulting positive bias applied by the positively charged plate 472 to the base of the transistor 103 serves to render the transistor 103 conductive from the collector to the emitter thereof, while upon the trigistor 99 being rendered nonconductive upon a negative bias being applied through the diode 153 by the coupling transformer 91, the positive bias applied to the base of the NPN type transistor 103 will be withdrawn by the capacitor 470 discharging through the transistor 103 whereupon the transistor 103 is rendered nonconductive upon the completion of such discharging operation.

It will be seen then that so long as the silicon controlled rectifier or trigistor 99 remains in a nonconductive state, the discharged capacitor 470 will render the transistor 103 nonconductive from the collector to the emitter thereof. However, upon the positive pulse A being applied through the diode 144 to the gating terminal 145 rendering the trigistor 99 conductive to pass current from the anode 450 to the cathode 396, a positive bias will be applied to the base of the NPN type transistor 103 by the recharged capacitor 470 to render the transistor 103 conductive of electrical energy from the positive terminal of the battery 164 through conductors 166, 203, 79, trigistor 99, conductor 454, resistor 427, conductor 429, and the base and emitter elements of the transistor 103 through conductors 445 and 165 to the negative terminal of the battery 164.

This energizing pulse at the output conductor 104 leading through the diode 169 to the collector of the transistor 103 will continue, as indicated graphically at VII of FIGURE 4, until the gating terminal 145 of the trigistor 99 has once again applied thereto a negative bias through the diode 153 to render the trigistor 99 nonconductive.

Such negative bias to turn off the trigistor 99 is applied through the coupling transformer 91 upon the control emitter 81 of the unijunction transistor 83 being biased by the charge applied to the capacitor 73 to a level in excess of a predetermined firing point of the unijunction transistor 83.

Thus, the duration of the energizing pulse applied through the transistor 103 will be dependent upon the time required to charge the capacitor 73 to the predetermined firing point of the unijunction transistor 83 which will in turn be dependent upon the amplitude of the sampled signal pulse applied at the output conductor 67 of the signal sampler network 18 and thereafter upon the time required to charge the capacitor 73 through the resistor 78 to this predetermined firing point.

There will be effected then by the conductive and nonconductive states of the NPN type transistor 103 in cooperation with the conductive and nonconductive states of the PNP type transistor 101 a controlled operation of the energizing pulses applied thereby to the controlling load winding 42 of the motor 12.

Thus upon the transistor 101 being rendered conductive while the transistor 103 is rendered nonconductive, there will be effected a flow of an electrical current pulse from the positive terminal of the battery 74 through the conductor 75, transistor 101, diode 168 and conductor 104 to the load winding 42 of the motor 12 and therethrough to the grounded terminal 203 returning thereby to the negative terminal of the battery 74. Such flow of the current pulse through the load winding 42 from the conductor 104 to the grounded conductor 203 will effect rotation of the motor 12 in a predetermined direction.

On the other hand, upon the transistor 103 being rendered conductive while the transistor 101 is rendered nonconductive, there will be effected a flow of an electrical current pulse from the positive terminal 166 of the battery 164 to the grounded terminal 203 and in an opposite direction through load winding 42 to the conductor 104 and thereby through the diode 169, transistor 103, and conductor 445 returning through the conductor 165 to the negative terminal of the battery 164. Such flow of the current pulse in an opposite direction through the load winding 42 from the grounded conductor 203 to the conductor 104 will effect rotation of the motor in an opposite predetermined direction.

However, upon both of the transistors 101 and 103 being simultaneously rendered conductive, there will be effected a path from the positive terminal of the battery 74 through the conductive transistor 101, diode 168, diode 169, the conductive transistor 103, conductor 445 and conductor 165 to the negative terminal of the battery 164 returning through the grounded conductor 166 leading from the positive terminal of the battery 164 to the negative grounded terminal of the battery 74. This latter passage will bypass the load winding 42 of the motor 12 so that the motor 12 is effectively de-energized. Similarly, upon both of the transistors 101 and 103 being rendered nonconductive, there will be no passage of energizing current to the load winding 42 whereupon the motor 12 will be also de-energized.

The present invention is directed to the novel pulse width modulator network 20 of FIGURE 2, as described and claimed herein. The novel pulse width modulated servo drive control system described herein with reference to FIGURES 1, 2, 3 and 4 is the subject matter of a U.S. application Ser. No. 484,547 filed Sept. 2, 1965, by Robert L. James and Harold Moreines, and now U.S. Patent No. 3,436,635 granted Apr. 1, 1969; the novel method of controlling a direct current motor described herein is the subject matter of a U.S. application Ser. No. 484,528 filed Sept. 2, 1965, by Harold Moreines, and now U.S. Patent No. 3,465,229 granted Sept. 2, 1969; the novel preamplifier network 16 and adder network 34 of FIGURE 2 is the subject matter of a U.S. application Ser. No. 489,627 filed Sept. 23, 1965 by Robert L. James, and now U.S. Patent No. 3,436,636 granted Apr. 1, 1969; the novel signal sampler network 18 of FIGURE 2 is the subject matter of a U.S. application Ser. No. 489,640 filed Sept. 23, 1965 by Robert L. James, now U.S. Patent No. 3,449,597, granted June 10, 1969; the novel two channel trigistor output stage motor control system 20–22 of FIGURE 2 is the subject matter of a U.S. application Ser. No. 491,585 filed Sept. 30, 1965 by Robert L. James, now U..S Patent No. 3,398,345, granted Aug. 20, 1968; the novel timing network 15 of FIGURE 3 is the subject matter of a U.S. application Ser. No. 698,564, filed Jan. 17, 1968, and now U.S. Patent No.3,465,236 granted Sept. 2, 1969 for a timing means including first and second timing networks to selectively gate turn-on devices in opposite senses in response to control pulses, and which U.S. application Ser. No. 698,564 was filed as a division of U.S. application Ser. No. 496,428 filed Oct. 15, 1965 by Robert L. James, now U.S. Patent No. 3,401,324, granted Sept. 10, 1968 for a Timing Network For A Modulated Servo Drive Control System; and the novel rate feedback loop network 14 of FIGURE 3 is the subject matter of a U.S. application Ser. No. 496,577 filed Oct. 15, 1965 by Robert L. James, now U.S. Patent No. 3,378,745, granted Apr. 16, 1968. All of the foregoing applications and patents have been assigned to The Bendix Corporation, the assignee of the invention described and claimed herein.

Although only one embodiment of the invention has been illustrated and described, various changes in the form and relative arrangement of the parts, which will now appear to those skilled in the art, may be made without departing from the scope of the invention. Reference is, therefore, to be had to the appended claims for a definition of the limits of the invention.

What is claimed is:

1. A pulse width modulator network comprising a pair of electrical discharge devices, one of said devices operable in a sense to initiate an electrical output pulse, the other of said devices operable in a sense to terminate the electrical output pulse, each of said devices having associated therewith a timing network to time the operation of the associated device, and means selectively operable in one state to set the networks associated with each of said devices and in another state to initiate the timing operation of said networks so as to control the operation of the associated devices and thereby the output pulse duration, the selectively operable means including a single control discharge element having conductive and nonconductive states, said single control discharge element being connected in circuit with the timing networks associated with each of said devices, means responsive to said control element when it passes from one state to the other state to set said timing networks, and means responsive to said control element when it passes from said other state to said one state to initiate the timing operation of said networks so as to control the operation of the associated devices and thereby the output pulse duration.

2. A pulse width modulator network comprising a pair of electrical discharge devices, one of said devices operable in a sense to initiate an electrical output pulse, the other of said devices operable in a sense to terminate the electrical output pulse, each of said devices having associated therewith a timing network to time the operation of the associated device, and means selectively operable in one state to set the networks associated with each of said devices and in another state to initiate the timing operation of said networks so as to control the operation of the associated devices and thereby the output pulse duration, each of the timing networks including a timing capactor, the timing capacitor in one of said networks being connected across a first electrical input means, the timing capacitor in the other of said networks being connected across a second electrical input means, and the selectively operable means in said one state being operative to discharge the capacitors in said timing networks and in said other state being operative to render the capacitors effective to be partially charged by electrical pulses of variable amplitude at the first and second input means, an auxiliary charging circuit for each of said capacitors rendered effective by the operation of the selectively operable means in said other state to increase the charge applied to said capacitors, the auxiliary charging circuit of each of said capacitors including resistance means for delaying the increase in the charge applied to said pair of capacitors, one of said pair of electrical discharge devices including means responsive to the first in time of said capacitors to be charged to a predetermined value to initiate the electrical output pulse, and the other of said pair of electrical discharge devices including means responsive to the second in time of said capacitors to be charged to said predetermined value to terminate the electrical output pulse.

3. A pulse width modulator network comprising a pair of electrical discharge devices selectively operable in one sense to initiate an electrical output pulse and in another sense to terminate the electrical output pulse, each of said devices having associated therewith a timing network to time the operation of the associated device, current control means having conductive and nonconductive states, said current control means being connected in circuit with the timing networks associated with each of said devices, each of the timing networks including a timing capacitor, the timing capacitor in one of said networks being connected across a first electrical input means and the timing capacitor in the other of said networks being connected across a second electrical input means, the timing capacitors being discharged upon said current control means passing from one of said states to the other state to set said timing networks, said timing capacitors upon said current control means passing from said other state to said one state being rendered effective to be partially charged by electrical pulses of variable amplitude at the first and second input means so as to initiate the timing operation of said networks, an auxiliary charging circuit for each of said capacitors rendered effective to increase the charge applied to said capacitors upon the current control means being in said one state, the auxiliary charging circuit of each of said capacitors including resistance means for delaying the increase in the charge applied to said pair of capacitors, each of the pair of electrical discharge devices including a control means responsive to the charge applied to the timing capacitor of the timing network associated therewith, the first in time of said timing capacitors to be charged to a predetermined value being effective to cause the control means of its associated electrical discharge device to cause the latter device to initiate the electrical output pulse, and the second in time of said timing capacitors to be charged to said predetermined value being effective to cause the control means of its associated electrical discharge device to cause the last mentioned device to terminate the electrical output pulse and thereby the duration of the electrical output pulse.

4. For use in a control system of a type including an electric motor and a load winding for controlling rotation of the motor; a pulse width modulator network comprising a pair of electrical discharge devices, one of said devices operable in one sense to initiate an electrical output pulse for energizing said winding in a sense for effecting rotation of the motor in one direction, the other of said devices operable in one sense to initiate an electrical output pulse for energizing said winding in a sense for effecting rotation of the motor in an opposite direction, each of said devices operable in another sense to terminate the electrical output pulse initiated by the other of said devices, each of said devices having associated therewith a timing network to time the operation of the associated device, each of the timing networks including a timing capacitor, the timing capacitor in one of said networks being connected across a first electrical input means, the timing capacitor in the other of said networks being connected across a second electrical input means, discharge control means having conductive and nonconductive states, said discharge control means being connected in circuit with the timing networks associated with each of said devices, the discharge control means in one of said states being operative to discharge the capacitors in said timing networks to set said timing networks and in the other of said states being operative to render the capacitors effective to be partially charged by electrical command pulses of different amplitude at the first and second input means so as to initiate the timing operation of said networks, an auxiliary charging circuit for each of said capacitors rendered effective to increase the charge applied to said capacitors upon the discharge control means being in the other of said states, the auxiliary charging circuit of each of said capacitors including means for delaying the increase in the charge applied to said pair of capacitors, each of the pair of electrical discharge devices including a control means responsive to the charge applied to the timing capacitor of the timing network associated therewith, the first in time of said timing capacitors to be charged to a predetermined value being effective to cause the control means to operate its associated electrical discharge device in the one sense to initiate the electrical output pulse for energizing the load winding of said motor, and the second in time of said timing capacitors to be charged to said predetermined value being effective to cause the control means to operate its associated electrical discharge device in the other sense to terminate the electrical output pulse initiated by the other of said devices.

5. The combination defined by claim 4 including other timing means for periodically rendering the discharge control means momentarily operative in said one state for discharging both timing capacitors, both of said electrical discharge devices including means to condition the electrical discharge devices to an initial state for subsequent operation in said one and other senses by the timing capacitor of the associated timing networks, and said other timing means being effective to condition the electrical discharge devices to said initial state simultaneously with the momentary rendering of said discharge control means operative in said one state for discharging both timing capacitors.

6. A timing system for controlling a pair of external circuits, said system comprising a first timing network, a second timing network, the first timing network including a first means to accumulate an electrical charge, said first charge accumulating means being connected across a first electrical input means, the second timing network including a second means to accumulate an electrical charge, said second charge accumulating means being connected across a second electrical input means, a discharge control means connected in circuit with the first and second timing networks and operative in one state to discharge the first and second charge accumulating means and in another state to render the first and second charge accumulating means effective to be initially partially charged by electrical pulses of different amplitudes applied at the first and second input means so as to initiate operation of the respective timing networks associated with said first and second charge accumulating means, time delay charging circuits for said first and second charge accumulating means to increase the charges initially applied thereto to a predetermined value over a time interval dependent upon the initial charges applied to the first and second charge accumulating means, first means responsive to the charge applied to the first charge accumulating means and effective upon the charge at the first charge accumulating means reaching said predetermined value to control one of said pair of external circuits, and second means responsive to the charge applied to the second charge accumulating means and effective upon the charge at the second charge accumulating means reaching said predetermined value to control the other of said pair of external circuits.

7. The combination defined by claim 6 including a single current flow control device having conductive and non-condutcive states connected in circuit with both of said first and second charge accumulating means, unidirectional current flow means responsive to said control device when it passes from one of said states to the other of said states to discharge said first and second charge accumulating means through said control device to set said first and second timing networks, and said unidirectional current flow means being responsive to said control device when it passes from said other state to said one state to permit the charging of said first and second charge accumulating means and thereby initiate the timing operation of said first and second timing networks.

8. The combination defined by claim 7 in which each of the first and second charge accumulating means includes a capacitor having opposite plates to be negatively and positively charged during the operation of the respective timing networks associated therewith, a current flow control device including an anode, a cathode and a control electrode, means connecting the cathode to the plate of the capacitor of both charge accumulating means to be negatively charged, and the unidirectional current flow means including a pair of diodes each having an anode element and a cathode element, first means connecting the cathode element of both diodes to the anode of the current flow control device, second means connecting the anode element of one of the diodes to the plate to be positively charged of one of said capacitors, and third means connecting the anode element of the other diode to the plate to be positively charged of the other of said capacitors, and a timing device for periodically biasing said control electrode momentarily so as to cause the control device to pass from a non-conductive to a conductive state between said anode and cathode thereof so that said diodes in response thereto discharge said capacitors through said control device to set said first and second timing networks, and said timing device thereafter biasing said control electrode during a predetermined time interval so as to cause the control device to pass from said conductive to a non-conductive state between said anode and cathode thereof so that said diodes in response thereto permit the charging of the capacitors of said first and second charge accumulating means by the electrical pulses of different amplitudes applied at the respective first and second input means and by the aforementioned time delay charging circuits.

9. For use in a control system of a type including an electric motor and a load winding for controlling rotation of the motor; a pulse width modulator network comprising a pair of electrical discharge devices, one of said devices operable in one sense to initiate an electrical output pulse for energizing said winding in a sense for effecting rotation of the motor in one direction, the other of said devices operable in one sense to initiate an electrical output pulse for energizing said winding in a sense for effecting rotation of the motor in an opposite direction, each of said devices operable in another sense to terminate the electrical output pulse initiated by the other of said devices, each of said devices having associated therewith, a timing network to time the operation of the associated device, and means selectively operable in one state to set the networks associated with each of said devices and in another state to initiate the timing operation of said networks so as to control the operation of the associated devices and thereby the output pulse duration for energizing the load winding of said motor.

10. The combination defined by claim 9 in which the selectively operable means includes a single control discharge element having conductive and nonconductive states, said single control discharge element being connected in circuit with the timing networks associated with each of said devices, means responsive to said control element when it passes from one state to the other state to set said timing networks, and means responsive to said control element when it passes from said other state to said one state to initiate the timing operation of said networks so as to control the operation of the associated devices and thereby the output pulse duration for energizing the load winding of said motor.

11. The combination defined by claim 9 in which each of the timing networks includes a timing capacitor, the timing capacitor in one of said networks being connected across a first electrical input means, the timing capacitor in the other of said networks being connected across a second electrical input means, and the selectively operable means in said one state being operative to discharge the capacitors in said timing networks and in said other state being operative to render the capacitors effective to be partially charged by electrical pulses of variable amplitude at the first and second input means, an auxiliary charging circuit for each of said capacitors rendered effective by the operation of the selectively operable means in said other state to increase the charge applied to said capacitors, the auxiliary charging circuit of each of said capacitors including resistance means for delaying the increase in the charge applied to said pair of capacitors, one of said pair of electrical discharge devices including means responsive to the first in time of said capacitors to be charged to a predetermined value to initiate the electrical output pulse for energizing the load winding of said motor, and the other of said pair of electrical discharge devices including means responsive to the second in time of said capacitors to be charged to said predetermined value to terminate the electrical output pulse.

12. For use in a control system of a type including an electric motor and a load winding for controlling rotation of the motor; a pulse width modulator network comprising a pair of electrical discharge devices selectively operable in one sense to initiate an electrical output pulse and in another sense to terminate the electrical output pulse, one of said devices operable in one sense to initiate an electrical output pulse for energizing said winding in a sense for effecting rotation of the motor in one direction, the other of said devices operable in one sense to initiate an electrical output pulse for energizing said winding in a sense for effecting rotation of the motor in an opposite direction, each of said devices operable in another sense to terminate the electrical output pulse initiated by the other of said devices, each of said devices having associated therewith a timing network to time the operation of the associated device, current control means having conductive and nonconductive states, said current control means being connected in circuit with the timing networks associated with each of said devices, each of the timing networks including a timing capacitor, the timing capacitor in one of said networks being connected across a first electrical input means and the timing capacitor in the other of said networks being connected across a second electrical input means, the timing capacitors being discharged upon said current control means passing from one of said states to the other state to set said timing networks, said timing capacitors upon said current control means passing from said other state to said one state being rendered effective to be partially charged by electrical pulses of variable amplitude at the first and second input means so as to initiate the timing operation of said networks, an auxiliary charging circuit for each of said capacitors rendered effective to increase the charge applied to said capacitors upon the current control means being in said one state, the auxiliary charging circuit of each of said capacitors including resistance means for delaying the increase in the charge applied to said pair of capacitors, each of the pair of electrical discharge devices including a control means responsive to the charge applied to the timing capacitor of the timing network associated therewith, the first in time of said timing capacitors to be charged to a predetermined value being effective to cause the control means of its associated electrical discharge device to cause the latter device to initiate the electrical output pulse for energizing the load winding of said motor, and the second in time of said timing capacitors to be charged to said predetermined value being fective to cause the control means of its associated electrical discharge device to cause the last mentioned device to terminate the electrical output pulse and thereby the duration of the electrical output pulse.

13. For use in a control system of a type including an electric motor and a load winding for controlling rotation of the motor; a pulse width modulator network including external circuit means for controlling energization of said load winding, a timing network, the timing network including means to accumulate on electrical charge, said charge accumulating means being connected across an electrical input means, a discharge control means connected in circuit with the timing network and operative in one state to discharge the charge accumulating means and in another state to render the charge accumulating means effective to be partially charged by an electrical pulse of variable amplitude applied at the input means so as to initiate operation of the timing network, an additional time delay charging circuit for the charge accumulating means, said time delay charging circuit being rendered effective upon operation of the discharge control means in said other state to increase the charge applied to the charge accumulating means, means for controlling said external circuit means for energizing the load winding upon the charge applied to the charge accumulating means being increased to a first predetermined value, and other means for controlling said external circuit means for de-energizing the load winding upon the charge applied to the charge accumulating means being increase to a second predetermined value.

14. For use in a control system of a type including an electric motor and a load winding for controlling rotation of the motor; a pulse width modulator network including a pair of external circuits for controlling energization of said load winding and a timing system for controlling said pair of external circuits, said timing system including a first timing network, a second timing network, the first timing network including a first means to accumulate an electrical charge, said first charge accumulating means being connected across a first electrical input means, the second timing network including a second means to accumulate an electrical charge, said second charge accumulating means being connected across a second electrical input means, a discharge control means connected in circuit with the first and second timing networks and operative in one state to discharge the first and second charge accumulating means and in another state to render the first and second charge accumulating means effective to be initially partially charged by electrical pulses of different amplitudes applied at the first and second input means so as to initiate operation of the respective timing networks associated with said first and second charge accumulating means, time delay charging circuits for said first and second charge accumulating means to increase the charges initially applied thereto to a predetermined value over a time interval dependent upon the initial charges applied to the first and second charge aculating means, first means responsive to the charge applied to the first charge accumulating means and effective upon the charge at the first charge accumulating means reaching said predetermined value to control one of said pair of external circuits for energizing the load winding of said motor, and second means responsive to the charge applied to the second charge accumulating means and effective upon the charge at the second charge accumulating means reaching said predetermined value to control the other of said pair of external circuits to terminate the electrical energization of the load winding of said motor initiated by the control of said one external circuit.

15. The combination defined by claim 14 including a single current flow control device having conductive and nonconductive states connected in circuit with both of said first and second charge accumulating means, unidirectional current flow means responsive to said control device when it passes from one of said states to the other of said states to discharge said first and second charge accumulating means through said control device to set said first and second timing networks, and said unidirectional current flow means being responsive to said control device when it passes from said other state to said one state to permit the charging of said first and second charge accumulating means and thereby initiate the timing operation of said first and second timing networks.

16. The combination defined by claim 15 in which each of the first and second charge accumulating means includes a capacitor having opposite plates to be negatively and positively charged during the operation of the respective timing networks associated therewith, a current flow control device including an anode, a cathode and a control electrode, means connecting the cathode to the plate of the capacitor of both charge accumulating means to be negatively charged, and the unidirectional current flow means including a pair of diodes each having an anode element and a cathode element, first means connecting the cathode element of both diodes to the anode of the current flow control device, second means connecting the anode element of one of the diodes to the plate to be positively charged of one of said capacitors, and third means connecting the anode element of the other diode to the plate to be positively charged of the other of said capacitors, and a timing device for periodically biasing said control electrode momentarily so as to cause the control device to pass from a nonconductive to a conductive state between said anode and cathode thereof so that said diodes in response thereto discharge said capacitors through said control device to set said first and second timing networks, and said timing device thereafter biasing said control electrode during a predetermined time interval so as to cause the control device to pass from said conductive to a nonconductive state between said anode and cathode thereof so that said diodes in response thereto permit the charging of the capacitors of said first and second charge accumulating means by the electrical pulses of different amplitudes applied at the respective first and second input means and by the aforementioned time delay charging circuits.

17. For use in a control system for a direct current motor of a type including a load winding for controlling the direction and speed of rotation of the motor; a time delay circuit controlling apparatus comprising first means for controlling the polarity and flow of current for selectively energizing the load winding in one sense to effect rotation of the motor in one direction and in another sense to effect rotation of the motor in an opposite direction, a a variable timer for controlling the operation of said first means so as to provide constant amplitude electrical pulses of variable duration and reversible polarity for effecting said selective energization of said load winding, and second means for controlling said variable timer so as to cause said first means to provide the energizing pulses of a selected duration to control the speed of the motor and of a selected polarity to control the direction of rotation of the motor.

18. For use in a control system for a direct current motor of a type including a load winding for controlling the direction and speed of rotation of the motor; a time delay circuit controlling apparatus comprising first means for controlling the polarity and flow of current for energizing the load winding, a variable timer for controlling the operation of said first means so as to provide constant amplitude electrical pulses of variable duration and reversible polarity for energizing said load winding, and second means for controlling said variable timer so as to provide the energizing pulses of a selected duration and polarity to control the speed and direction of rotation of the motor, said variable timer including first and second timing capacitors, and time delay means for charging both of said capacitors; said second means including a first variable amplitude voltage input means associated with said first capacitor, and a second variable amplitude voltage input means associated with said second capacitor; and said variable timer including third means responsive to the charges applied to said first and second capacitors, said third means being effective upon the charge applied to one of said timing capacitors exceeding a predetermined value to operate said first control means to select the polarity of the energizing pulse dependent upon the relative amplitudes of the voltages applied at said first and second input means and thereby upon the first in time of said timing capacitors to be so charged, and said third means being effective upon the charge applied to the other of said timing capacitors exceeding said predetermined value to terminate the energizing pulse at a time dependent upon the amplitude of the voltage applied at the input means associated with said other timing capacitor.

References Cited

UNITED STATES PATENTS

| | | | |
|---|---|---|---|
| 3,191,113 | 6/1965 | Gargani | 318—341 X |
| 3,297,930 | 1/1967 | Payne | 318—341 X |
| 3,274,514 | 9/1966 | Foulger | 328—58 X |

ORIS L. RADER, Primary Examiner

ROBERT J. HICKEY, Assistant Examiner

U.S. Cl. X.R.

328—58; 332—9

UNITED STATES PATENT OFFICE
CERTIFICATE OF CORRECTION

Patent No. 3,486,100    Dated December 23, 1969

Inventor(s) Robert L. James

It is certified that error appears in the above-identified patent and that said Letters Patent are hereby corrected as shown below:

Claim 9, column 20, line 64 delete the comma (,) second occurrence.

Claim 12, column 22, line 8 change "fective" to -- effective --.

Claim 13, column 22, line 17 change "on" to -- an --.

Claim 17, column 24, line 3 delete "a" first occurrence.

SIGNED AND SEALED
MAY 12 1970

(SEAL)
Attest:

Edward M. Fletcher, Jr.
Attesting Officer

WILLIAM E. SCHUYLER, JR.
Commissioner of Patents